United States Patent
Mijac et al.

(10) Patent No.: US 9,975,502 B2
(45) Date of Patent: May 22, 2018

(54) CIRCUIT MODULE FOR ISOLATING COMPONENTS OF A MULTI-VOLTAGE VEHICLE ELECTRICAL SYSTEM

(71) Applicant: Brose Fahrzeugteile GmbH & Co. Kommanditgesellschaft, Hallstadt, Hallstadt (DE)

(72) Inventors: Anto Mijac, Bamberg (DE); Benedikt Dremel, Stegaurach (DE)

(73) Assignee: Brose Fahrzeugtelle GmbH & Co. Kommanditgesellschaft, Hallstadt, Hallstadt (DE)

( * ) Notice: Subject to any disclaimer, the term of this patent is extended or adjusted under 35 U.S.C. 154(b) by 192 days.

(21) Appl. No.: 14/902,482

(22) PCT Filed: Jul. 24, 2014

(86) PCT No.: PCT/EP2014/065867
§ 371 (c)(1),
(2) Date: Dec. 31, 2015

(87) PCT Pub. No.: WO2015/011212
PCT Pub. Date: Jan. 29, 2015

(65) Prior Publication Data
US 2016/0159296 A1 Jun. 9, 2016

(30) Foreign Application Priority Data
Jul. 24, 2013 (DE) .................. 10 2013 012 615

(51) Int. Cl.
*B60L 1/00* (2006.01)
*B60R 16/023* (2006.01)
*B60R 16/03* (2006.01)

(52) U.S. Cl.
CPC ............ *B60R 16/023* (2013.01); *B60R 16/03* (2013.01)

(58) Field of Classification Search
CPC .................................................. B60R 16/023
See application file for complete search history.

(56) References Cited

U.S. PATENT DOCUMENTS

| | | | |
|---|---|---|---|
| 5,771,470 A | 6/1998 | Nimmo et al. | |
| 6,438,462 B1 * | 8/2002 | Hanf ..................... | G06F 1/3203 340/693.4 |

(Continued)

FOREIGN PATENT DOCUMENTS

| | | |
|---|---|---|
| CN | 202243035 U | 5/2012 |
| DE | 101 56 416 A1 | 5/2002 |

(Continued)

OTHER PUBLICATIONS

International Search Report, corresponding to PCT/EP2014/065867, dated Nov. 5, 2014, 4 pages.

(Continued)

*Primary Examiner* — Daniel Puentes
(74) *Attorney, Agent, or Firm* — Lewis Roca Rothgerber Christie LLP (57) ABSTRACT

A multi-voltage electrical system for a vehicle, which comprises a first subsystem with a transceiver and a second subsystem with a control unit, is provided. A first control signal path which couples a first signal output of the transceiver to a first signal input of the control unit is formed and arranged to transmit a first control signal from the first signal output to the first signal input. The first control signal path comprises a first circuit module which is formed to assume a blocking condition in response to a faulty operating voltage supply in the first subsystem and/or in the second subsystem, in which the transmission of the first control signal from the first signal output to the first signal input via the first control signal path is inhibited.

18 Claims, 5 Drawing Sheets

(56) References Cited

U.S. PATENT DOCUMENTS

| | | |
|---|---|---|
| 2002/0172351 A1 | 11/2002 | Beutler et al. |
| 2004/0222767 A1 | 11/2004 | Ohkouchi et al. |
| 2007/0053124 A1 | 3/2007 | Bolz et al. |
| 2010/0033163 A1 | 2/2010 | Ahrens et al. |
| 2014/0350781 A1 | 11/2014 | Mehringer et al. |

FOREIGN PATENT DOCUMENTS

| | | |
|---|---|---|
| DE | 695 26 824 T2 | 11/2002 |
| DE | 10 2006 048 073 A1 | 4/2008 |
| DE | 10 2009 003 019 A1 | 11/2010 |
| DE | 10 2012 215 542 A1 | 4/2013 |
| EP | 1 155 919 A2 | 11/2001 |
| EP | 1 652 281 B1 | 1/2007 |
| EP | 1 291 998 B1 | 9/2009 |

OTHER PUBLICATIONS

Data Sheet AN00093, TJA1020 LIN Transceiver, Philips Semiconductors, Rev. 02, Sep. 16, 2005, 44 pages.
CN Office action and Search Report dated Oct. 19, 2016 issued in corresponding CN application No. 201480041431.0, 11 pages.
English translation of CN Office action, 3 pages.
English translation of Search Report, 2 pages.

\* cited by examiner

CIRCUIT MODULE FOR ISOLATING COMPONENTS OF A MULTI-VOLTAGE VEHICLE ELECTRICAL SYSTEM

CROSS-REFERENCE TO A RELATED APPLICATION

This application is a National Phase Patent Application of International Patent Application Number PCT/EP2014/065867, filed on Jul. 24, 2014, which claims priority of German Patent Application Number 10 2013 012 615.0, filed on Jul. 24, 2013.

BACKGROUND

The present invention relates to a multi-voltage electrical system for a vehicle and to a circuit module for isolating a multi-voltage vehicle electrical system.

Vehicles such as passenger cars, trucks, trains and the like occasionally are equipped with a multi-voltage electrical system in which a first subsystem is formed to be operated at a first operating voltage and a second subsystem is formed to be operated at a second operating voltage. In this connection, in particular the 12 V subsystem and the 48 V subsystem for passenger cars are known.

To one of the two subsystems a transceiver can be associated, which via a first ground terminal of the first subsystem, for example in the form of a first ground stud, is connected to ground. The transceiver usually serves for transmitting and receiving control signals, wherein in the transceiver a further processing of the received control signals also can be effected. An example for such transceiver is the LIN (Local Interconnect Network) transceiver. The transceiver can be operated at the first operating voltage, i.e. for example at 12 V.

To the second subsystem a control unit can be associated, such as a microcontroller. The control unit and the transceiver can be integrated in a housing and in so far be mounted as a one-piece component. Via a second ground terminal of the second subsystem, which is arranged spatially separate from the first ground terminal and for example is present in the form of a second ground stud, the control unit is connected to the same ground as the transceiver. Ground usually is the ground of the vehicle.

The control unit generally operates at a voltage of 5 V or 3.3 V. This voltage usually is provided to the control unit via a voltage converter, such as a DC/DC converter or a linear regulator, which correspondingly converts the second operating voltage, for example 48 V. The control unit supplies actuation signals to electronic units of the vehicle electronic system, such as to a driver of a power electronic switch. These electronic units then actuate one or more electric motors of the vehicle, for example an electric vehicle drive, a seat adjustment drive, etc.

The transceiver of the first subsystem is communicatively coupled to the control unit of the second subsystem. For this purpose, a number of control signal paths usually are arranged between the transceiver and the control unit, which connect one or more signal outputs of the transceiver with signal inputs of the control unit and signal outputs of the control unit with the signal inputs of the transceiver. The control signal paths transmit control signals from the control unit to the transceiver and control signals from the transceiver to the control unit. These control signal paths usually are low-ohm direct connections. Such control signal paths are known for example from FIG. 12 of the data sheet AN00093 for the PHILIPS LIN-Transceiver TJA 1020.

In multi-voltage vehicle electrical systems it is problematic that the transceiver of the first subsystem usually is connected to a first ground terminal and the control unit of the second subsystem usually is connected to a second ground terminal spatially separate from the first ground terminal. In the end, however, both the first ground terminal and the second ground terminal are connected with the same ground, namely the vehicle ground, in a star-shaped pattern. When a faulty operating voltage supply occurs in the first subsystem and/or in the second subsystem, compensating currents can occur in the multi-voltage vehicle electrical system and in particular in the control signal paths or within a component connected to both subsystems, which can damage and sometimes even destroy the units of the first subsystem and/or the second subsystem.

In this connection. EP 1 291 998 B1 proposes to provide a galvanic isolation between the two subsystems, i.e. between the two voltage levels, for example in the form of a usual transformer. Furthermore, there are provided monitoring modules which carry out an isolation monitoring of the subsystems. The monitoring modules are integrated in a controller which is connected with at least two voltage levels. The controller furthermore includes a device for separating the connection of one or more subsystems from the controller and/or a device for switching off the controller upon detection of a faulty operating voltage supply.

What is disadvantageous in this known approach is the expensive construction. A plurality of monitoring modules are necessary and, in addition, there is proposed a galvanic isolation by means of a transformer which has a high weight and involves comparatively high costs.

DE 10 2012 215 542 A1 discusses the problem of a common ground connection in a multi-voltage vehicle electrical system. In the case of a disturbance on this common ground line, a polarity reversal of components can occur in the low-voltage subsystem. For the solution of the problem it is proposed to provide a further ground terminal to which measuring means are associated, which are equipped to measure a current flow via the further ground terminal. Furthermore, diagnostic means are provided, which on the basis of the measured current flow diagnose a disturbance in the common ground terminal and/or in the further ground terminal in dependence on at least one operating condition of the multi-voltage vehicle electrical system.

SUMMARY

It is an object of the present invention to propose a multi-voltage vehicle electrical system which has an improved fault current resistance and at the same time is characterized by a simple construction. Furthermore, it is an object of the present invention to propose a circuit module for isolating subsystems of a multi-voltage vehicle electrical system.

According to a first aspect, these objects are solved by a multi-voltage vehicle electrical system with the features as described herein. According to a second aspect, the objects are solved by a circuit module with the features as described herein.

According to the first aspect it is provided that the first control signal path, which couples a first signal output of the transceiver to a first signal input of the control unit, comprises a first circuit module.

Via the first circuit module, the first control signal path on the one hand is connected to the first ground terminal and/or the second ground terminal and on the other hand is charged with the first operating voltage and/or with the second operating voltage. The first circuit module of the first control signal path is formed to assume a blocking condition in response to a faulty operating voltage supply in the first subsystem and/or in the second subsystem, in which the transmission of the first control signal from the first signal output to the first signal input via the first control signal path is inhibited.

The present invention proceeds from the fact that a multi-voltage vehicle electrical system or a component of the multi-voltage vehicle electrical system, which is coupled to both operating voltage terminals and to both ground terminals, increasingly is required to have a defined fault current resistance in the case of a faulty operating voltage supply. In the multi-voltage vehicle electrical system it should be avoided in particular that a breakdown from the subsystem with the higher operating voltage into the subsystem with the lower operating voltage damages or destroys a component of the multi-voltage vehicle electrical system.

The faulty operating voltage supply for example exists when the transceiver and/or the control unit no longer are connected to ground. Such incidence also is referred to as mass demolition or mass loss. Furthermore, a faulty operating voltage supply exists when a short-circuit has occurred in the first subsystem and/or in the second subsystem and/or a potential difference between the first ground terminal and the second ground terminal exceeds a threshold value, such as +/−1 V.

The latter fault also is referred to as ground offset. The amount of the threshold value at which the first circuit module assumes the blocking condition can be defined by dimensioning components of the first circuit module.

A fault current obtained due to such faulty operating voltage supply must not exceed a certain maximum value, such as for example a few microamperes, according to a requirements catalog. For such current limitation the first circuit module is suitable, which the first control signal path comprises according to the invention, since the first control signal path on the one hand is connected to the first ground terminal and/or the second ground terminal via the first circuit module and on the other hand is charged with the first operating voltage and/or with the second operating voltage. A faulty operating voltage supply accordingly has a direct effect on the first control signal path, namely such that in the first control signal path a transmission of the first control signal is inhibited. The first control signal path hence blocks in response to a faulty operating voltage supply.

A separation of the first subsystem from the second subsystem of the multi-voltage vehicle electrical system hence takes place between the transceiver, which for example comprises a LIN (Local Interconnect Network) transceiver, and the control unit which for example comprises a microcontroller.

An advantage of the solution according to the invention resides in that the isolation of the two subsystems is effected between the transceiver on the one hand and the control unit on the other hand, as there comparatively few lines are to be isolated. For example, merely four signal paths generally are arranged between a LIN transceiver and a microcontroller. To achieve a fault current resistance, a comparatively little effort hence is necessary.

In addition, between the transceiver and the control unit merely such control signal paths generally must be separated in which the linearity of the signal transmission is less critical than for example in measurement lines for the transmission of analog measurement signals. For this reason, too, the expenditure to achieve the fault current resistance is comparatively low.

The first subsystem for example is a 12 V vehicle electrical system and the second subsystem is a 48 V vehicle electrical system. The first subsystem is operated with the first operating voltage of 12 V and the second subsystem is operated with the second operating voltage of 48 V. Both subsystems of the multi-voltage vehicle electrical system according to the invention include a respective ground terminal. Both the first ground terminal of the first subsystem and the second ground terminal of the second subsystem, which is arranged spatially separate from the first ground terminal, are connected to the same ground, in general to vehicle ground. The first ground terminal is present for example in the form of a first ground stud and the second ground terminal in the form of a second ground stud, wherein the second ground stud is arranged spatially separate from the first ground stud. Joining the first and the second ground terminal onto the common vehicle ground for example is effected outside the first circuit module or outside a component in which the control unit and the transceiver can be arranged.

Due to the fact that the first control signal path both is connected to one of the two ground terminals and is charged with at least one of the two operating voltages via the first circuit module, the first circuit module is capable of reacting to a faulty operating voltage supply in the first and/or second subsystem. In response to such faulty operating voltage supply, the first circuit module assumes a blocking condition, in which the signal transmission from the first signal output to the first signal input is inhibited. In particular, the first circuit module also avoids the generation of a fault current above the permitted maximum value in the first control signal path.

The first circuit module selectively is charged directly with the first and/or second operating voltage or alternatively by means of one or more voltage converter(s). The first circuit module hence can also be charged with a converted first and/or converted second operating voltage.

The first control signal path, which comprises the first circuit module, for example is a unidirectional control signal path which is formed to permit a signal flow in one direction and inhibit the same in the opposite direction. Usually, such unidirectional control signal paths are employed for coupling a LIN transceiver to a microcontroller. On the first control signal path, not only control signals in the narrower sense can be transmitted, but for example also digitized measurement signals and/or data signals. The first control signal hence can be present for example in the form of a measurement signal, a data signal and/or in the form of an actuation signal. For example, the transceiver provides the first control signal as digital signal.

For example, the first control signal path galvanically couples the first signal output onto the first signal input. Accordingly, it is preferred that no galvanic isolation is provided between the transceiver and the control unit.

Further embodiments of the multi-voltage vehicle electrical system according to the invention will be described below. The features of these further embodiments can be combined with each other and/or with the optional features already mentioned above to form further variants, unless they expressly have been described as alternative to each other.

In a first embodiment of the multi-voltage vehicle electrical system the first circuit module comprises a transistor with a first signal terminal and a first control terminal, wherein the first signal terminal is connected to the first or second ground terminal and wherein the first control terminal is connected to the first signal output. By providing the first control signal at the first signal output, the transceiver accordingly controls the first transistor. The signal transmission from the transceiver to the control unit is effected via the first transistor. The transistor is formed to assume a blocking condition in the case of a faulty operating voltage supply, in which no signal transmission is effected from the transceiver to the control unit, in particular a current flowing there does not exceed a specified maximum value either.

For example, the first transistor is a current-controlled transistor in which the first signal terminal is formed by an emitter terminal which is connected to the first ground terminal, for example directly or via a resistor. In this variant, the first control terminal is a base terminal which is controlled by the first control signal provided by the transceiver. For example, the first transistor is a bipolar NPN transistor.

Furthermore, the first circuit module for example comprises a second transistor which for transmitting the first control signal to the first signal input is coupled to the first transistor and on the one hand is charged with the second operating voltage and on the other hand is connected to the second ground terminal and to the first signal input. In the normal case, in which there is no faulty operating voltage supply, the transmission of the first control signal from the first signal output of the transceiver to the first signal input of the control unit hence is effected via the first transistor and the second transistor. Both transistors for example are current-controlled transistors, such as bipolar transistors. The first transistor for example is a bipolar NPN transistor and the second transistor is a bipolar PNP transistor. In the normal case, a transmission of the first control signal is effected via these two transistors. Due to the fact that the first transistor is connected to the first ground terminal and the second transistor is charged with the second operating voltage and is connected to the second ground terminal, a faulty operating voltage supply in the first subsystem and/or in the second subsystem leads to a blocking condition in the first control signal path, in which no more transmission of the first control signal is effected and in particular a possible fault current in this first control signal path does not exceed a specified maximum.

In one variant, the first transistor is a field effect transistor which includes a second signal terminal, wherein the first signal terminal is a gate terminal which is connected to the first ground terminal, and the second signal terminal is a source terminal which is connected to the first signal input of the control unit, and wherein the first control terminal, which is connected to the first signal output of the transceiver, is a drain terminal. In the case of a faulty operating voltage supply in the multi-voltage vehicle electrical system, the field effect transistor blocks, since there no more is a potential difference between the gate terminal and the source terminal. At best, a leakage current still flows, which in general, however, lies far below a permitted maximum fault current of e.g. 200 nA. For example, the field-effect transistor is a p-channel MOSFET (Metal Oxide Semiconductor Field Effect Transistor).

In another embodiment the first circuit module comprises a first diode which includes an anode terminal and a cathode terminal, wherein the first signal output of the transceiver is connected to the anode terminal and wherein the cathode terminal is connected to the first signal input of the control unit and via a resistor to the second ground terminal. The first diode prevents a breakdown from the voltage level of the second subsystem to the voltage level of the first subsystem. The first control signal path hence is out by the first diode. In the normal case, the first diode transmits the first control signal from the transceiver to the control unit, i.e. from the first signal output to the first signal input. When a ground loss occurs in the second subsystem, an increase in potential occurs at the second ground terminal, which also is reflected at the cathode terminal of the first diode. The first diode thereby is put into a blocking condition in which there is no transmission of the first control signal from the transceiver to the control unit.

In another embodiment of the multi-voltage vehicle electrical system the first circuit module comprises a capacitor which includes a first electrode terminal and a second electrode terminal, wherein the first signal output is connected to the first electrode terminal and the first signal input is connected to the second electrode terminal. This variant is useful in particular when the first control signal is an alternating signal, i.e. a signal whose level changes with a particular frequency, such as 20 kHz. For example, this variant is useful if the first control signal path is a data signal line between the transceiver and the control unit. The capacitor neither does effect a galvanic isolation of the two subsystems, since the same are connected with the same ground via their ground terminals. Due to the capacitive coupling by the capacitor, steep flanks are possible in the first control signal without this leading to a malfunction. This embodiment is characterized by an extremely low amount of circuitry and by a high robustness.

For example, two pull-up resistors are provided in the embodiment with the capacitor, of which a first one is coupled to the first electrode terminal and is charged with the first operating voltage, and of which a second one is charged with the second operating voltage and is coupled to the second electrode terminal. Furthermore, the second electrode terminal of the capacitor for example is connected to the second ground terminal via a second diode arranged in blocking direction. By dimensioning the second pull-up resistor and the capacitor it is defined how a change in level of the first control signal at the first signal output is reflected at the first signal input of the control unit. Below, an example for such dimensioning will be presented. The second diode provides both for a fast change in level in the first control signal path and for a permanent high-level.

So far, there has been described a control signal path which is formed to transmit the first control signal from the transceiver of the first subsystem to the control unit of the second subsystem. Frequently, it also is desired to transmit control signals from the control unit to the transceiver, as is explained below.

In another embodiment of the multi-voltage vehicle electrical system the control unit is formed to provide a second control signal. Furthermore, the multi-voltage vehicle electrical system in this embodiment comprises a second control signal path which couples a second signal output of the control unit to a second signal input of the transceiver, and which is formed and arranged to transmit the second control signal from the second signal output to the second signal input. The second control signal path comprises a second circuit module via which the second control signal path on the one hand is connected to the first ground terminal and/or the second ground terminal and on the other hand is charged with the first operating voltage and/or with the second operating voltage. The second circuit module is formed to assume a blocking condition in which the transmission of the second control signal from the second signal output to the second signal input is inhibited, if a faulty operating voltage supply is present in the first subsystem and/or in the second subsystem.

The second circuit module can be implemented in a similar way as the first circuit module. For example, the second circuit module comprises a number of current-controlled transistors, which will be explained below in more detail with respect to the exemplary embodiments.

In one embodiment of the multi-voltage vehicle electrical system, the transceiver and the control unit are coupled to each other via a number of first control signal paths and a number of second control signal paths. Each first control signal path, i.e. each control signal path which provides for the signal transmission from the transceiver to the control unit, for example comprises a respective first circuit module, wherein the first circuit modules can be implemented differently. For example, a first circuit module comprises said first capacitor, and another first circuit module comprises said first diode or said first transistor in the form of the voltage-controlled transistor. Each second control signal path, i.e. each control signal path which provides for the signal transmission from the control unit to the transceiver, for example comprises a respective second circuit module, wherein the second circuit modules also can be implemented differently. For example, at least one of the second circuit modules comprises a number of current-controlled transistors. The circuit modules of the control signal paths hence can be implemented differently in dependence on the signal direction and/or in dependence on the type of the signal to be transmitted.

In the case of signal changes on the first control signal path compensating currents can occur, which flow via the multi-voltage vehicle electrical system. In another embodiment, the first circuit module therefore comprises a compensating capacitor which includes a first electrode terminal and a second electrode terminal, wherein the first electrode terminal is connected to the first ground terminal and the second electrode terminal is connected to the second ground terminal. Due to the fact that between the first ground terminal and the second ground terminal the compensating capacitor is provided, the electromagnetic compatibility (EMC), in particular the line-conducted EMC, is improved and disturbances on lines are reduced. The compensating capacitor is formed to compensate short-time compensating currents, so that the same do not flow via the multi-voltage vehicle electrical system, but merely in a component which comprises the control unit, the transceiver and the first circuit module. The compensating capacitor in particular is advantageous when the first circuit module includes said capacitor. In other variants of the first circuit module it is, however, also suitable for improving the EMC and for reducing disturbances.

As already mentioned above, the transceiver for example is a LIN transceiver which is operated at an operating voltage of 12 V. The control unit of the second subsystem for example is a microcontroller which is operated at an operating voltage of 5 V.

According to a second aspect, the above-mentioned objects are solved by a circuit module as described herein. The inventive circuit module of the second aspect shares the above-mentioned advantages of the first aspect. Exemplary embodiments of the circuit module analogously correspond to the above-mentioned embodiments.

BRIEF DESCRIPTION OF THE DRAWINGS

Further features and advantages of the invention will become apparent from the following description of exemplary embodiments with reference to the Figures.

DETAILED DESCRIPTION

Figure 1:
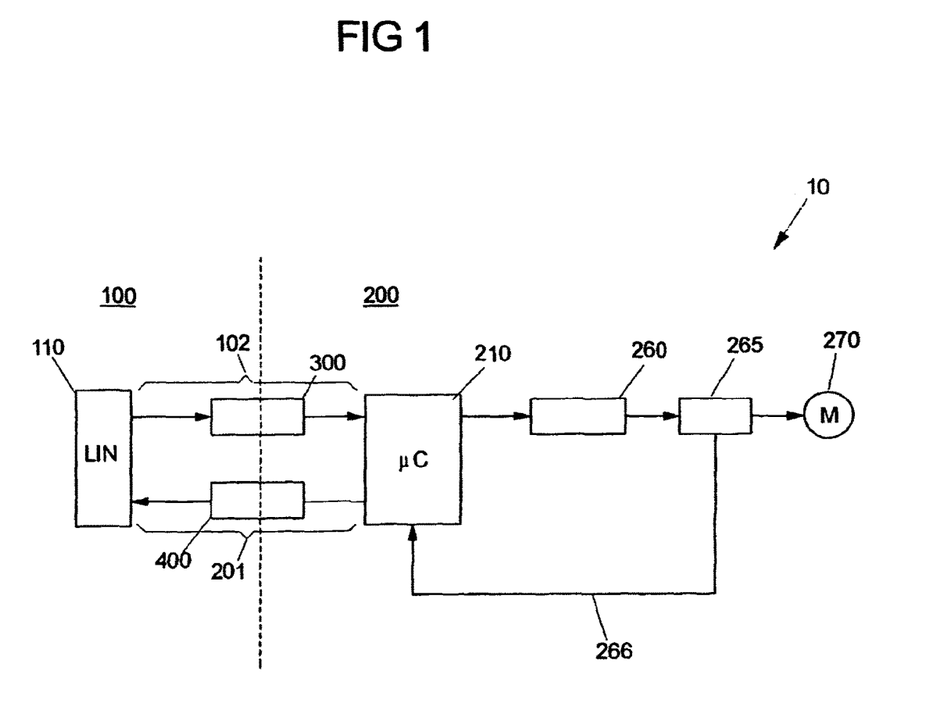
FIG. 1 shows a schematic and exemplary partial view of an embodiment of a multi-voltage vehicle electrical system according to the invention.

FIG. 1 by way of example and schematically shows a structure of a multi-voltage electrical system 10 according to the invention for a vehicle. The multi-voltage vehicle electrical system 10 comprises a first subsystem 100 and a second subsystem 200. The first subsystem 100 is operated at a first operating voltage and the second subsystem 200 at a second operating voltage. The first operating voltage for example is 12 V and the second operating voltage for example is 48 V.

The second subsystem 200 comprises a control unit 210, for example a microcontroller (μC). The control unit 210 sends actuation signals to a driver 260 of the multi-voltage vehicle electrical system 10. The driver 260 actuates one or more power-electronic switches 265. A motor 270 (M) thereby can be actuated with a set voltage and/or with a set current. Via a measurement line 266, measurement signals are supplied to the control unit 210. In dependence on these measurement signals, the control unit 210 controls the driver 260.

The first subsystem 100 includes a transceiver 110, for example in the form of a LIN transceiver or LIN master.

The transceiver 110 and the control unit 210 are communicatively coupled to each other via a first control signal path 102 and a second control signal path 201. Via the first control signal path 102 the transceiver 110 supplies a first control signal to the control unit 210, and via the second control signal path 201 the control unit 210 supplies a second control signal to the transceiver 110. Both control signal paths 102 and 201 thus are unidirectional control signal paths which allow a signal flow merely in one direction. Beside this first control signal path 102 and the second control signal path 201 further control signal paths can be provided for coupling the transceiver 110 to the control unit 210.

To avoid fault currents in the first control signal path 102 and in the second control signal path 210, which can be caused by a faulty operating voltage supply in the first subsystem 100 and/or in the second subsystem 200, a first circuit module 300 is provided in the first control signal path 102 and a second circuit module 400 is provided in the second control signal path 201, in accordance with the invention.

The faulty operating voltage supply for example exists when the transceiver 110 or the control unit 210 no longer is connected to ground. Such incidence also is referred to as mass demolition or mass loss. Furthermore, a faulty operating voltage supply exists when a short-circuit has occurred in the first subsystem 100 and/or in the second subsystem 200 and/or a potential difference between a first ground terminal 150 (see FIGS. 2 to 6) and a second ground terminal 250 (see FIGS. 2 to 6) exceeds a threshold value, such as +/−1 V. A fault current obtained due to such faulty operating voltage supply must not exceed a certain maximum value, such as for example a few microamperes, according to a requirements catalog. For such current limitation, the first circuit module 300, which the first control signal path 102 comprises according to the invention, and the second circuit module 300, which the second control signal path 201 comprises according to the invention, are suitable.

Both the first circuit module 300 and the second circuit module 400 are formed to transmit control signals. More exactly, the first circuit module 300 is formed to transmit a first control signal, which is provided by the transceiver 110 at a first signal output 120 (see FIGS. 2 to 6), to a first signal input 220 (see FIGS. 2 to 6) of the control unit 210. The second circuit module 400 likewise is formed to provide a second control signal, which is provided by the control unit 210 at a second signal output 240 (see FIGS. 2 to 6), to a second signal input 140 (see FIGS. 2 to 6) of the transceiver 110.

In direct response to a faulty operating voltage supply in the first subsystem 100 and/or in the second subsystem 200, the first circuit module 300 and the second circuit module 400 each assume a blocking condition in which the transmission of the first control signal from the first signal output 120 to the first signal input 220 and the transmission of the second control signal from the second signal output 240 to the second signal input 140 are inhibited.

According to the invention, an isolation of the two subsystems 100 and 200 hence is effected between the transceiver 110 and the control unit 210. In FIGS. 1 to 6, the dashed vertical line between the first subsystem 100 and the second subsystem 200 marks this isolation of the two subsystems 100 and 200.

An advantage of the multi-voltage vehicle electrical system 10 consists in that the isolation of the two subsystems 100 and 200 is effected between the transceiver 110 on the one hand and the control unit 210 on the other hand. Comparatively few lines are to be isolated there. To achieve a fault current resistance, a comparatively little effort hence is necessary. In addition, between the two control units merely those control signal lines generally are to be isolated in which the linearity of the signal transmission is less critical. For example, an isolation of the measurement line 266 is avoided. The linearity would be necessary there for the correct detection of measurement signals.

With respect to FIG. 2, the arrangement of the transceiver 110 in the first subsystem 100 and the arrangement of the control unit 210 in the second subsystem 200 will now be explained in detail. These explanations also apply for the design variants according to FIGS. 3 to 6.

The first operating voltage of e.g. 12 V is provided by a first energy supply unit 190, such as for example a battery. The second operating voltage is provided by a second energy supply unit 290, for example likewise in the form of a bade. The second operating voltage is about 48 V, for example.

In the first subsystem 100 several first operating voltage terminals 180 are provided to provide the first operating voltage. Analogously, a number of second operating voltage terminals 280 are provided in the second subsystem 200 to provide the (converted) second operating voltage.

The first subsystem 100 includes several first ground terminals 150, via which components of the first subsystem 100 are connected to ground. The second subsystem 200 likewise includes several second ground terminals 250, via which components of the second subsystem 200 are connected to ground. The ground terminals 150 and 250 for example are spatially separate ground studs, which are connected to the vehicle body. In the end, both the first ground terminals 150 and the second ground terminals 250 are connected with the same ground, usually the ground of the vehicle. This corresponds to a star-shaped connection of the first and second ground terminals 150, 250 to the ground of the vehicle. Joining of the ground terminals 150 and 250 onto the common vehicle ground is effected outside the circuit modules 300 and 400 and possibly outside a component in which the control unit 210 and the transceiver 110 are arranged.

The first subsystem 100 includes the transceiver 110 which is connected to the first ground terminal 150 and to the first operating voltage terminal 180. The transceiver 110 for example is a LIN transceiver.

The second subsystem 200 comprises the control unit 210, for example a microcontroller. The control unit 210 is connected to a second ground terminal 250. By means of a voltage converter 284 in the form of a DC/DC converter, the second operating voltage is supplied to the control unit 210. For example, the DC/DC converter 284 is a converter which converts an input voltage of 48 V into an output voltage of 5 V and provides these 5 V to the control unit 210. Instead of the DC/DC converter, there can also be provided a linear regulator or another voltage converter.

Via the first circuit module 300, the first control signal path 102 is connected both to the first ground terminal 150 and to the second ground terminal 250.

The same applies for the second circuit module 400, via which the second control signal path 201 is connected both to the first ground terminal 150 and to the second ground terminal 250.

In the following, concrete design variants of the first circuit module 300 and the second circuit module 400 will be presented with respect to FIGS. 2 to 6. The circuit modules 300 and 400 each serve the isolation of the subsystems 100 and 200 in the case of a faulty operating voltage supply.

Figure 2:
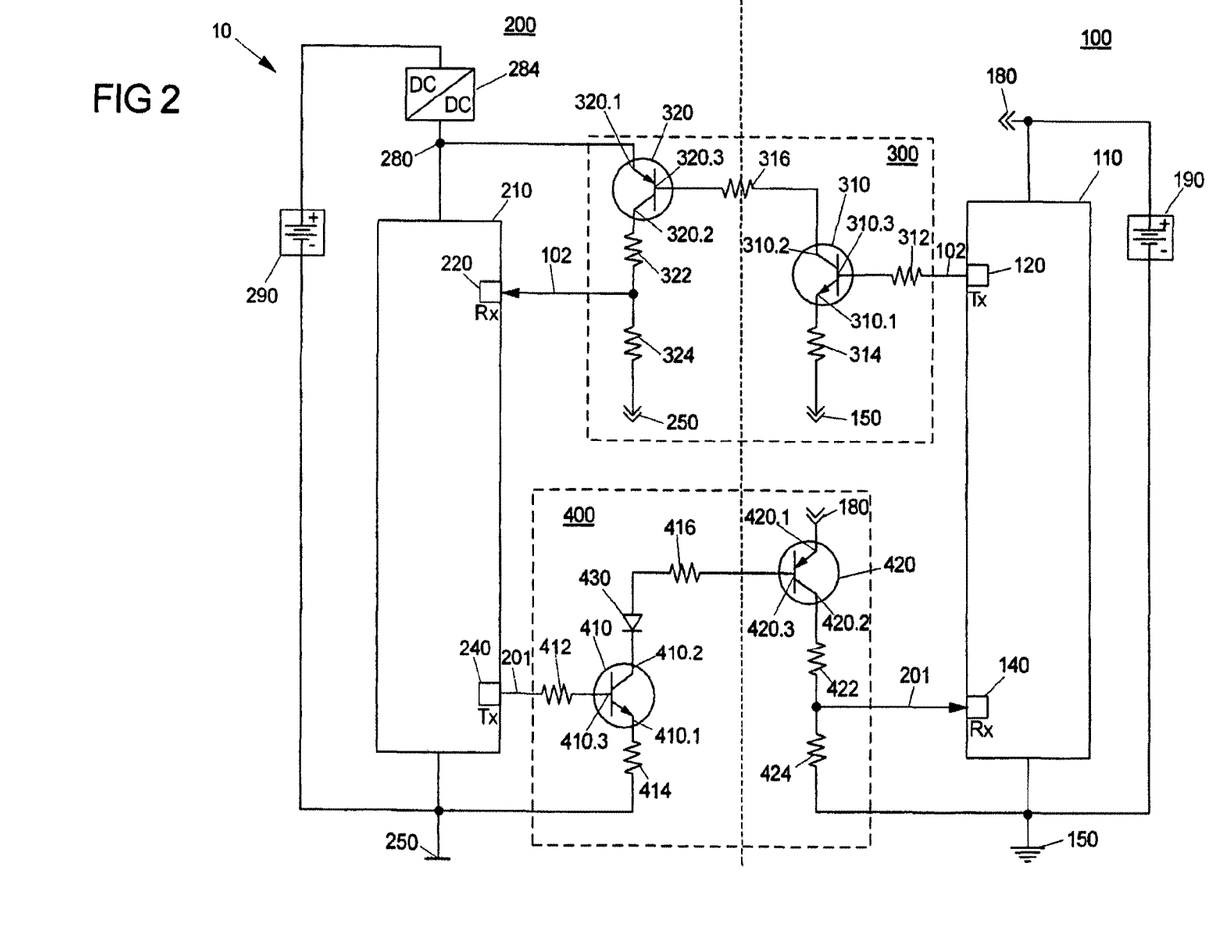
FIG. 2 shows a schematic and exemplary representation of a first design variant of a first circuit module for isolating subsystems of a multi-voltage vehicle electrical system.

The first design variant of the first circuit module 300 as shown in FIG. 2 is based on the use of two current-controlled transistors, the bipolar transistors 310 and 320. The first bipolar transistor 310 is a bipolar NPN transistor whose base terminal 310.3 is connected to the first signal output 120 (Tx) of the transceiver 110 via a resistor 312. A first emitter terminal 310.1 of the first transistor 310 is connected to the first ground terminal 150 via a further resistor 314. Via a further resistor 316, a collector terminal 310.2 of the first transistor 310 is connected to a base terminal 320.3 of a second transistor 320. This second transistor 320 is a bipolar PNP transistor. Its emitter terminal 320.1 is connected to the second operating voltage terminal 280, i.e. to an output of the DC/DC converter 284. Via two further resistors 322 and 324, a collector terminal 320.2 of the second transistor 320 is connected to the second ground terminal 250. Between the two resistors 322 and 324 there is provided a terminal which is supplied to the first signal input 220 (Rx) of the control unit 210.

The second transistor 320 for example is an analog transistor which has a dielectric strength of 70 V. The first transistor 310 can be designed either analog or digital (i.e. with integrated series resistor).

In the case of a faulty operating voltage supply in the first subsystem 100 and/or in the second subsystem 200, the first circuit module 300 assumes a blocking condition due to the two transistors 310 and 320, in which in the first signal path 102 no compensating current is flowing, so to speak, and thus neither the transceiver 110 nor the control unit 210 are damaged or destroyed by such compensating current.

The second circuit module 400 is constructed similar to the first circuit module 300. It is formed to supply the control signal provided by the control unit 210 at the second signal output 240 to the second signal input 140 of the transceiver 110. For this purpose, the second circuit module 400 likewise includes two bipolar transistors, namely a third bipolar transistor 410 in the form of a bipolar NPN transistor and a fourth bipolar transistor 420 in the form of a bipolar PNP transistor. The second signal output 240 is supplied to the base terminal 410.3 of the third transistor 410 via a resistor 412. Via a further resistor 414, an emitter terminal 410.1 of the third transistor 410 is supplied to the second ground terminal 250. A collector terminal 410.2 of the third transistor 410 leads to a base terminal 420.3 of the fourth transistor 420 via a third diode 430 and a further resistor 416.

An emitter terminal 420.1 of the fourth transistor 420 is connected to the first operating voltage terminal 180. The signal provided by the control unit 210 is supplied to the second signal input 140 of the transceiver 110 via a collector terminal 420.2 of the second transistor 420 and a further resistor 422. The second signal input 140 furthermore is connected to the first ground terminal 150 via a further resistor 424.

In the case of a faulty operating voltage supply in the first subsystem 100 and/or in the second subsystem 200, the second circuit module 400 assumes a blocking condition due to the two transistors 410 and 420, in which in the second signal path 201 no compensating current is flowing, so to speak, and thus neither the transceiver 110 nor the control unit 210 are damaged or destroyed by such compensating current.

Figure 3:
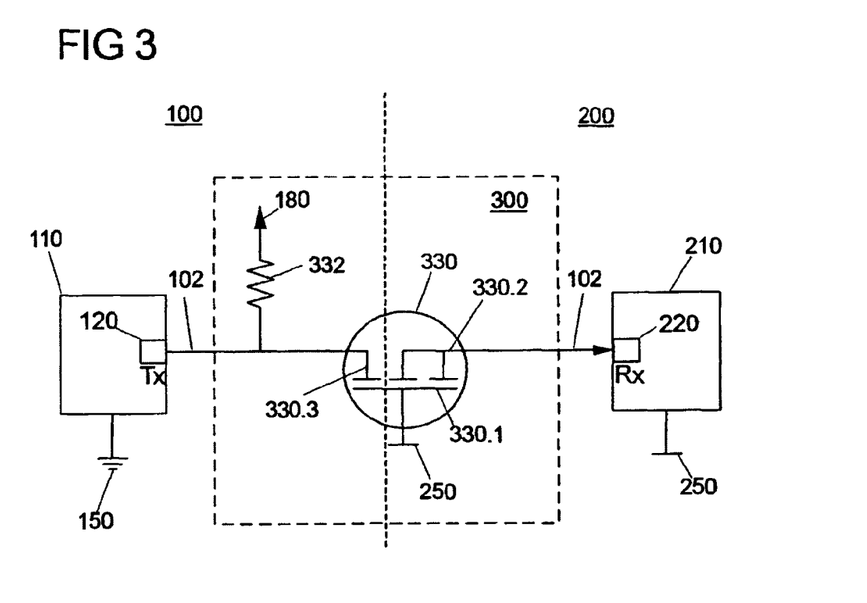
FIG. 3 shows a schematic and exemplary representation of a second design variant of the first circuit module.

FIG. 3 schematically shows a second design variant for the first circuit module 300 which is integrated in the first control signal path 102. In FIG. 3, like also in FIG. 4 to FIG. 6, the transceiver 110 and the control unit 210 are shown in simplified form.

In the second design variant of the first circuit module 300 a p-channel MOSFET is provided according to FIG. 3, whose drain terminal 330.3 is supplied to the signal output 120. A gate terminal 330.1 of the MOSFET 330 is connected to the second ground terminal 250. A source terminal 330.2 is supplied to the first signal input 220. Furthermore, a pull-up resistor 332 is provided, via which the first signal output 120 and the drain terminal 330.3 are coupled to the first operating voltage terminal 180.

The first control signal, which is provided by the transceiver 110 at the first signal output 120, hence is supplied to the first signal input 220 of the control unit 210 by the circuit module 300 via the drain-source connection. When the first control signal has a High-level, the MOSFET 330 connects through. When the control signal has a Low-level, the MOSFET 330 blocks. When a faulty operating voltage supply now occurs for example in the second subsystem 200, the voltage between the gate terminal 330.1 and the source terminal 320.2 is about 0 V, so that the MOSFET 330 blocks and no fault current is generated, so to speak, in the control signal path 102. There is at best obtained a leakage current of a few nanoamperes.

This design variant of the first circuit module 300 can be used when the first control signal is a continuous or an alternating signal. The first control signal is an alternating signal when it has a frequency of e.g. 20 kHz, which lies above a minimum frequency. For example, the first control signal is a data signal which contains a bit sequence. The first control signal is a continuous signal when its level does not change or changes only occasionally. The first control signal, which in this design variant is to be transmitted via the first circuit module 300, can have steep flanks without this leading to a functional impairment. This design variant is characterized by a particularly simple dimensioning and a very low amount of circuitry. Furthermore, it is robust against disturbances. It is suitable in particular for the transmission of control signals of the transceiver 110 to the control unit 210, i.e. in particular for the transmission of signals from the LIN transceiver to the microcontroller.

Figure 4:
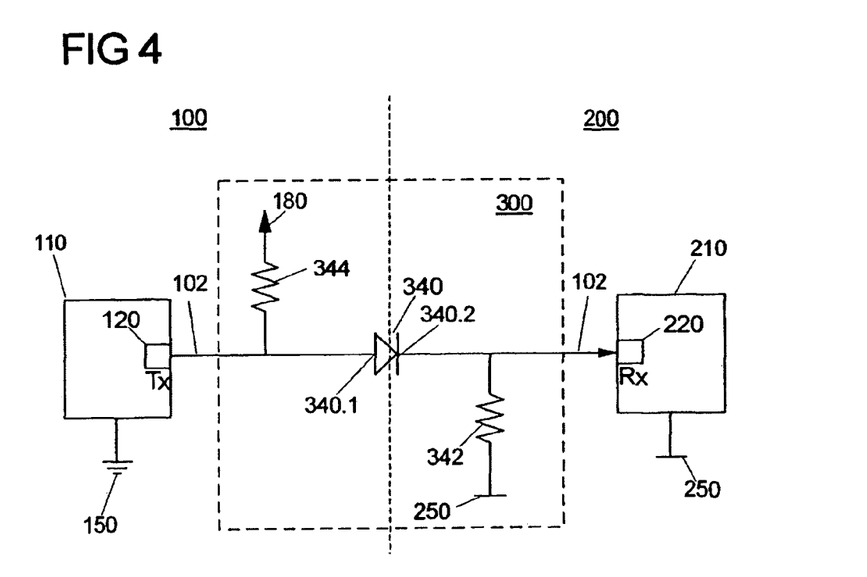
FIG. 4 shows a schematic and exemplary representation of a third design variant of the first circuit module.

FIG. 4 schematically and by way of example shows a third design variant for the first circuit module 300. In the control signal path 102 a first diode 340 is provided. The first diode includes an anode terminal 340.1 and a cathode terminal 340.2, wherein the first signal output 120 is connected to the anode terminal 340.1, and wherein the cathode terminal 340.2 is connected to the first signal input 220 and via a resistor 342 to the second ground terminal 250.

Furthermore, a pull-up resistor 344 is provided, via which the first signal output 120 and the anode terminal 340.1 are connected to the first operating voltage terminal 180. The first diode 340 only is conducting as long as the potential at the second ground terminal 250 lies below the voltage of the first subsystem 100. When a faulty operating voltage supply occurs in the second subsystem 200, for example due to a ground loss, the voltage at the second ground terminal 250 rises and the first diode 340 assumes a blocking condition. Consequently, no compensating currents flow in the first control signal path 102. There is at best obtained a low diode leakage current of a few nanoamperes.

The third design variant according to FIG. 4 is suitable both for transmitting the first control signal in the form of a continuous signal or in the form of an alternating signal. Here as well, steep flanks are possible in the first control signal without this leading to a functional impairment. The third design variant of the first circuit module 300 is characterized by a simple dimensioning, a very small amount of circuitry and robustness against disturbances. In particular, the third design variant according to FIG. 3 is suitable to transmit a control signal from the first controller 110 to the second controller 220, i.e. from the LIN transceiver to the microcontroller.

Figure 5:
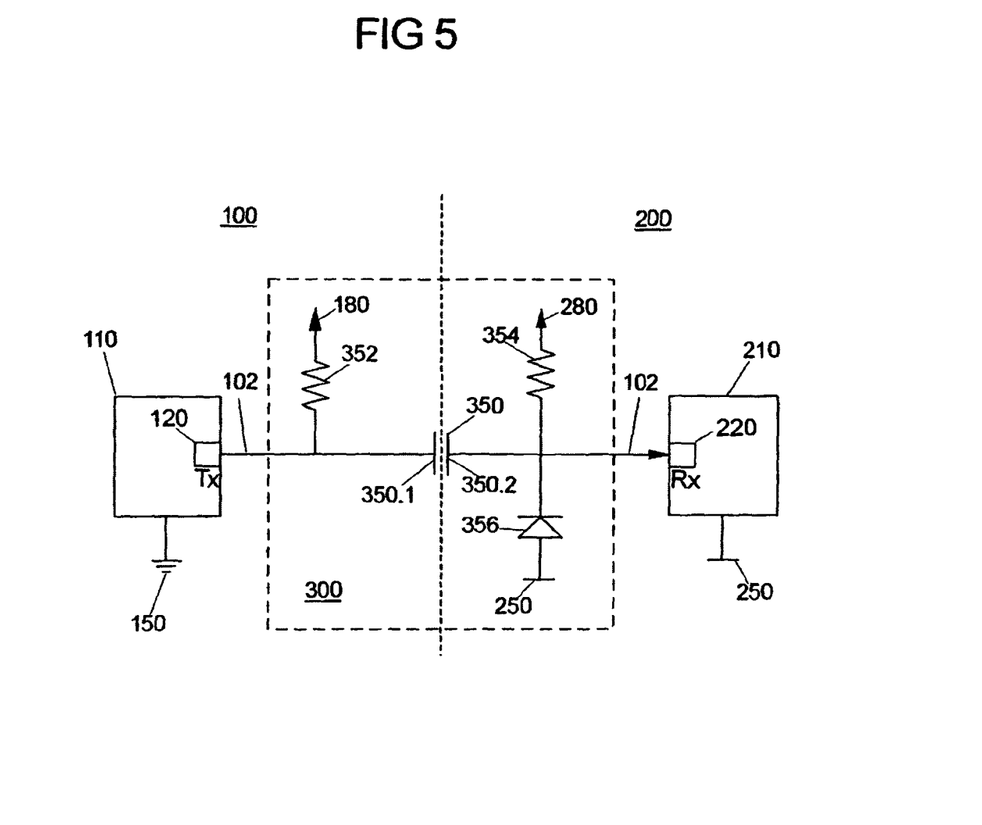
FIG. 5 shows a schematic and exemplary representation of a fourth design variant of the first circuit module.

FIG. 5 shows a fourth design variant of the first circuit module 300. Accordingly, a capacitor 350 is provided. The first signal output 120 is connected to a first electrode terminal 350.1 of the capacitor 350. A second electrode terminal 350.2 of the capacitor 350 is connected to the first signal input 220. Furthermore, both electrode terminals 350.1 and 350.2 are connected to the first operating voltage terminal 180 and to the second operating voltage terminal 280 via a respective pull-up resistor 352, 354. In addition, a second diode 356 is provided, which is connected between the second ground terminal 250 and the second electrode terminal 350.2 and is arranged in blocking direction. The pull-up resistor 354 and the second diode 356 on the receiver side, i.e. on the side of the second subsystem 200, are provided to allow for a fast signal change and a permanent High-level.

The fourth design variant in particular is suitable when the first control signal, which is to be transmitted from the first controller 110 to the second controller 210, is an alternating signal. For example, the first control signal path 102 in this variant is a data signal line like the RxD or TxD line known in connection with the LIN transceiver.

The pull-up resistor 32 for example has a value of 1 kΩ and the capacitor 350 has a value of 150 nF. The dimensioning of the pull-up resistor 354 depends on the frequency of the first control signal. For example, this frequency is about 20 kHz, wherein the times in which the signal has a Low-level, are comparatively short, for example a few hundred microseconds, such as 676 µs. The Low-level of the first control signal for example is not more than 0.5 V and the High-level for example is at least 4 V. At such values, a resistance value for the pull-up resistor 354 of a few 10 kΩ, such as for example 42.8 kΩ, is obtained.

When the level of the first control signal, which the transceiver 110 provides at the first signal output 120, changes from a High-level to a Low-level, a charge compensation occurs at the capacitor 350 and the voltage swing at the control unit 210 corresponds to the voltage swing at the transceiver 110. The voltage swing at the control unit then depends on the value of the pull-up resistor 34 and the capacitance value of the capacitor 350.

When the signal level of the first control signal provided by the transceiver 110 changes from a Low-level to a High-level, a circuit is closed via the second diode 356 and a charge compensation again occurs at the capacitor 350. Here as well, the voltage swing at the control unit 210 corresponds to the voltage swing at the transceiver 110.

The advantage of the fourth design variant of the first circuit module 300 on the one hand lies in the blockage for direct currents created by the capacitor 350. Due to the capacitive coupling, steep flanks also are possible in the first control signal to be transmitted. Furthermore, the fourth circuit variant also is characterized by a very low amount of circuitry and hence also by a high robustness against disturbances. Furthermore, a DC ground offset between the first ground terminal 150 and the second ground terminal 250 is uncritical, as the first control signal is transmitted differentially.

Figure 6:
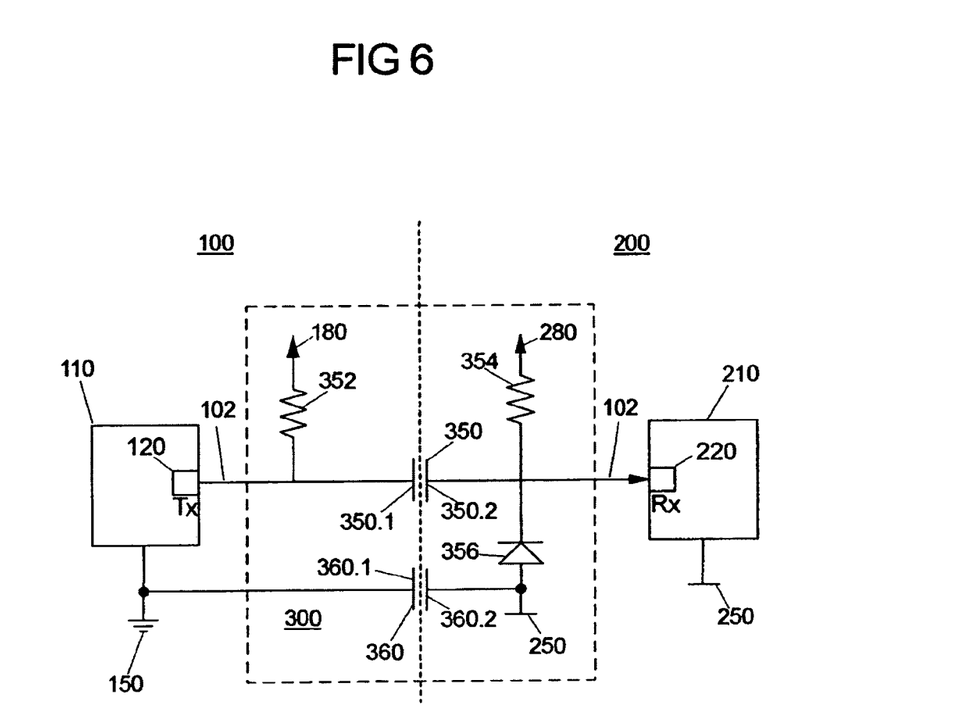
FIG. 6 shows a schematic and exemplary representation of a fifth design variant of the first circuit module.

The variant of the first circuit module 300 according to FIG. 6 corresponds to the variant shown in FIG. 5 in essential parts. In the case of signal changes on the first control signal path 102 compensating currents can occur, however, which flow via the multi-voltage vehicle electrical system 10. In addition, the first circuit module 300 in the variant according to FIG. 6 therefore comprises a compensating capacitor 360 which includes a first electrode terminal 360.1 and a second electrode terminal 360.2, wherein the first electrode terminal 360.1 is connected to the first ground terminal 150 and the second electrode terminal 360.2 is connected to the second ground terminal 250. Due to the fact that between the first ground terminal 150 and the second ground terminal 250 the compensating capacitor 360 is provided, the electromagnetic compatibility (EMC), in particular the line-conducted EMC, is improved and disturbances on lines of the multi-voltage vehicle electrical system 10 are reduced. The compensating capacitor 360 compensates short-time compensating currents, so that the same do not flow via the multi-voltage vehicle electrical system 10, but merely in a component which comprises the control unit 210, the transceiver 110 and the first circuit module 300. The compensating capacitor 360 in particular is advantageous when the first circuit module 300 includes said capacitor 350. In the other variants of the first circuit module 300 it is, however, also suitable for improving the EMC.

The transceiver 110 and the control unit 210 for example each are implemented in a separate chip. Both the transceiver 110 and the control unit 210 on the other hand can be integrated in a common component. The transceiver 110 for example forms a part of a second control unit of the second subsystem.

As examples for the first subsystem and the second subsystem the 12 V electrical system and the 48 V electrical system have been mentioned. The invention, however, is by no means limited to these two electrical systems, but in principle is suitable for multi-voltage vehicle electrical systems of any kind.

The invention claimed is:

1. A multi-voltage electrical system for a vehicle, the system comprising:
    a first subsystem which is formed to be operated at a first operating voltage and which comprises a transceiver which is connected to ground via a first ground terminal, wherein the transceiver is formed to provide a first control signal;
    a second subsystem which is formed to be operated at a second operating voltage and which comprises a control unit which is connected to the same ground via a second ground terminal, wherein the first operating voltage is lower than the second operating voltage; and
    a first control signal path which couples a first signal output of the transceiver to a first signal input of the control unit and which is formed and arranged to transmit the first control signal from the first signal output to the first signal input;
    wherein the first control signal path comprises a first circuit module via which the first control signal path on the one hand is connected to the first ground terminal and/or to the second ground terminal and on the other hand is charged with the first operating voltage and/or with the second operating voltage, wherein the first circuit module is formed to assume a blocking condition in response to a faulty operating voltage supply in the first subsystem and/or in the second subsystem, in which the transmission of the first control signal from the first signal output to the first signal input via the first control signal path is inhibited.

2. The multi-voltage vehicle electrical system according to claim 1, wherein the faulty operating voltage supply exists when at least one of the following applies:
    the transceiver no longer is connected to ground;
    the control unit no longer is connected to ground;
    a short-circuit in the first subsystem and/or in the second subsystem; or
    a potential difference between the first ground terminal and the second ground terminal exceeds a threshold value.

3. The multi-voltage vehicle electrical system according to claim 1, wherein the first circuit module comprises a first transistor with a first signal terminal and a first control terminal, wherein the first signal terminal is connected to the first or second ground terminal and wherein the first control terminal is connected to the first signal output.

4. The multi-voltage vehicle electrical system according to claim 3, wherein the first transistor is a current-controlled transistor, wherein the first signal terminal is an emitter terminal of the current-controlled transistor, which is connected to the first ground terminal, and wherein the first control terminal is a base terminal.

5. The multi-voltage vehicle electrical system according to claim 3, wherein the first circuit module comprises a second transistor which for transmitting the first control signal to the first signal input is coupled to the first transistor and on the one hand is charged with the second operating voltage and on the other hand is connected to the second ground terminal and to the first signal input.

6. The multi-voltage vehicle electrical system according to claim 3, wherein the first transistor is a field effect transistor which includes a second signal terminal, wherein the first signal terminal is a gate terminal, the second signal terminal is a source terminal which is connected to the first signal input, and wherein the first control terminal is a drain terminal.

7. The multi-voltage vehicle electrical system according to claim 1, wherein the first circuit module comprises a first diode which includes an anode terminal and a cathode terminal, wherein the first signal output is connected to the anode terminal, and wherein the cathode terminal is connected to the first signal input and via a resistor to the second ground terminal.

8. The multi-voltage vehicle electrical system according to claim 1, wherein the first circuit module comprises a capacitor which includes a first electrode terminal and a second electrode terminal, wherein the first signal output is connected to the first electrode terminal and the first signal input is connected to the second electrode terminal.

9. The multi-voltage vehicle electrical system according to claim 8, wherein
the first electrode terminal is charged with the first operating voltage via a first pull-up resistor; and
the second electrode terminal is charged with the second operating voltage via a second pull-up resistor.

10. The multi-voltage vehicle electrical system according to claim 8, wherein the second electrode terminal is connected to the second ground terminal via a second diode arranged in blocking direction.

11. The multi-voltage vehicle electrical system according to claim 1, wherein
the control unit is formed to provide a second control signal;
the multi-voltage vehicle electrical system includes a second control signal path which couples a second signal output of the control unit to a second signal input of the transceiver and which is formed and arranged to transmit the second control signal from the second signal output to the second signal input, and
the second control signal path comprises a second circuit module via which the second control signal path on the one hand is connected to the first ground terminal and/or to the second ground terminal and on the other hand is charged with the first operating voltage and/or with the second operating voltage, wherein the second circuit module is formed to assume a blocking condition in response to a faulty operating voltage supply in the first subsystem and/or in the second subsystem, in which the transmission of the second control signal from the second signal output to the second signal input is inhibited.

12. The multi-voltage vehicle electrical system according to claim 1, wherein the first control signal path and/or the second control signal path is an undirectional control signal path.

13. The multi-voltage vehicle electrical system according to claim 1, wherein the transceiver comprises a LIN transceiver which is formed to be operated at the first operating voltage.

14. The multi-voltage vehicle electrical system according to claim 1, wherein the control unit includes a microcontroller which is formed to be operated at a second operating voltage converted by a voltage converter.

15. The multi-voltage vehicle electrical system according to claim 1, wherein the ground is the ground of the vehicle.

16. The multi-voltage vehicle electrical system according to claim 1, wherein the first control signal path galvanically couples the first signal output to the first signal input.

17. The multi-voltage vehicle electrical system according to claim 1, wherein the first circuit module comprises a compensating capacitor which includes a first electrode terminal and a second electrode terminal, wherein the first electrode terminal is connected to the first ground terminal and the second electrode terminal is connected to the second ground terminal.

18. A circuit module for isolating subsystems of a multi-voltage electrical system of a vehicle, wherein the multi-voltage vehicle electrical system comprises:
a first subsystem which is formed to be operated at a first operating voltage and which comprises a transceiver which is connected to ground via a first ground terminal, wherein the transceiver is formed to provide a first control signal;
a second subsystem which is formed to be operated at a second operating voltage and which comprises a control unit which is connected to the same ground via a second ground terminal; and
a first control signal path which couples a first signal output of the transceiver to a first signal input of the control unit and which is formed and arranged to transmit the first control signal from the first signal output to the first signal input;
wherein the circuit module is designed for an arrangement in the first control signal path and furthermore is formed
to on the one hand connect the first control signal path to the first ground terminal and/or to the second ground terminal and on the other hand charge it with the first operating voltage and/or with the second operating voltage, wherein the first operating voltage is lower than the second operating voltage; and
to assume a blocking condition in response to a faulty operating voltage supply in the first subsystem and/or in the second subsystem, in which the transmission of the first control signal from the first signal output to the first signal input via the first control signal path is inhibited.

* * * * *